United States Patent Office 3,487,956
Patented Jan. 6, 1970

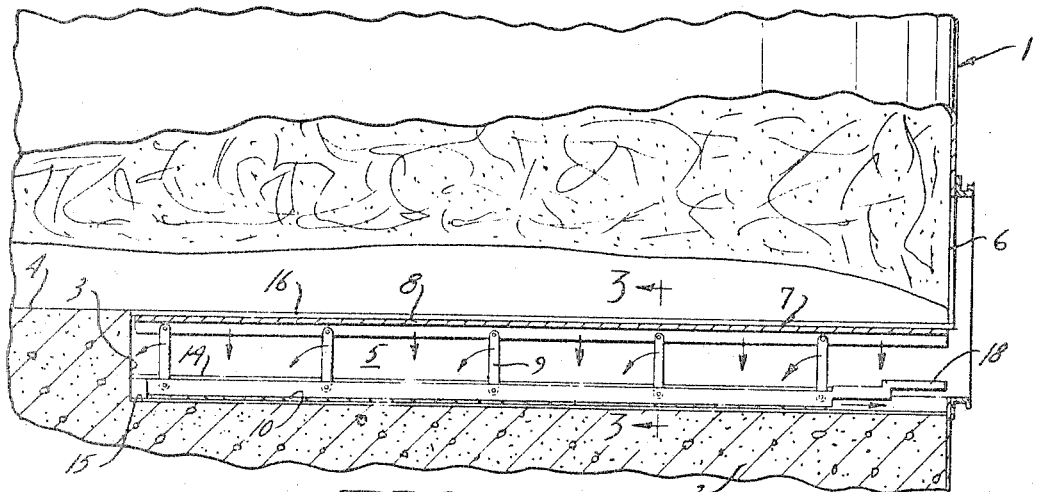

3,487,956
INTEGRAL SHIELD FOR DISCHARGE CONVEYOR TROUGH
John W. Schaefer, Barrington, Ill., assignor to A. O. Smith Corporation, Milwaukee, Wis., a corporation of New York
Filed Feb. 28, 1968, Ser. No. 708,956
Int. Cl. B65g 65/30
U.S. Cl. 214—17      4 Claims

ABSTRACT OF THE DISCLOSURE

A collapsible, integral shield disposed in the discharge trough of a bottom unloading storage structure such as a silo. The shield element is adapted to be disposed in the top horizontal planar surface of the unloader trough during loading of the storage structure and can be collapsed without removal from the storage structure to provide a substantially clear passageway through the discharge trough for insertion of a bottom unloader into the storage structure.

BACKGROUND OF THE INVENTION

Previous trough shields are of the type disclosed in the Jones Patent 2,955,720. As stated in that patent, the hood 14 is removed completely from the structure after it has been filled. Also, the hood 14 of Jones is disposed *above* the floor level of the storage structure. With materials which are only semi-fibrous in nature, such as high-moisture corn, it has been discovered that arching of the stored material above the floor level of the structure is difficult, whereas providing a trough shield flush with floor level, such as applicant's shield, is uniformly successful with both fibrous and semi-fibrous materials.

SUMMARY OF THE INVENTION

Applicant's shield does not require removal after the structure has been filled. The device is simply collapsed into the bottom of the unloader trough and the unloader apparatus inserted into the trough over the shield plate. The trough is provided with a longitudinal medial pocket extending the length of the trough into which the shield collapses so that the planar upper surface of the shield is continuous with the floor of the trough when in the collapsed position. After unloading of the structure has been completed, and the unloader removed, the shield may again be moved to the erect position to provide a clear passage through the unloader trough for reinsertion of the bottom unloader into the storage structure.

BRIEF DESCRIPTION OF THE DRAWINGS

The drawings illustrate the presently preferred embodiment of the invention.

FIGURE 1 is a side sectional view of a storage structure with parts broken away showing the trough shield of the invention in the erect position and with the collapsed position shown in phantom;

FIG. 2 is an end sectional view of the apparatus of FIG. 1 shown in the collapsed position; and FIG. 3 is a section view taken on line 3—3 of FIG. 1.

DESCRIPTION OF THE PREFERRED EMBODIMENT

As shown in the drawings, a storage structure 1 includes a base 2 having an unloader trough 3 therein. As best seen in FIG. 1, the base 2 comprises a floor 4 having a recess 5 extending radially outward from the center of the base 2 to outer wall 6 of the storage structure 1.

A collapsible trough shield assembly 7 is shown disposed in the recess 5. The trough shield assembly 7 includes a movable shield member 8, support trusses 9 pivotally connected to the shield member 8 and a slidable subtrough member 10, to which the lower ends of support trusses 9 are pivotally connected. The subtrough member 10 is slid outwardly to cause support trusses 9 to move outwardly and lower the shield member 8 into the bottom of the trough 3.

The recess 5 is fitted with a trough assembly 11 which includes side elements 12 which define side walls 13 of trough 3 and edge portions 14 of bottom 15 of the trough 3. Floor plates 16 are provided at the top of each side wall 13 and include flanges 17 which extend out over trough 3 as best seen in FIGS. 2 and 3.

When the shield assembly 7 is in the erect position during loading of the storage structure 1, the movable shield member 8 defines a continuous planar floor surface in co-operation with the flanges 17 of the floor plates 16. The assembly 7 thus prevents entry of stored material into the trough 3 during loading.

The shield assembly 7 may include a member 18, which is slidable along the trough actuatable from outside the storage structure as shown in FIG. 1. The member 18 is connected to the subtrough member 10 to collapse and erect the assembly 7 as required by causing the subtrough member 10 to slide inwardly or outwardly in the bottom of the trough 3.

I claim:
1. A collapsible integral trough shield for the unloader trough of a bottom unloading storage structure, comprising a shield element having an upper position whereat the shield element is disposed substantially in the top planar surface of the unloader trough during loading of the storage structure and having a lower position whereat the shield element is disposed in the bottom of the trough and defines a portion of the unloader trough on which the unloader operates, and means operable to collapse said shield from said upper position to said lower position to provide a substantially clear passageway through said unloader trough and into said storage structure to facilitate insertion of the bottom unloader into the storage structure.

2. The structure of claim 1, wherein said storage structure includes a pair of floor plates extending partially over the sides of the trough with the adjacent side edges of the plates being spaced apart to provide a radially extending clearance therebetween, said shield element being generally flat and having a width greater than the width of said clearance and disposed in flatwise relation with the under surface of said plates to enclose said clearance when the shield element is in said upper position.

3. The structure of claim 1, wherein said trough has a bottom surface and the shield element is disposed substantially flush with said bottom surface when the shield element is in the lower position.

4. A collapsible trough shield for providing a continuous horizontal floor structure in a bottom unloading storage structure having an unloader trough below the floor level, said trough shield comprising a floor plate member disposed at floor level in said unloader trough during filling of the storage structure, and collapsible support means for supporting said floor plate member at floor level and comprising a plurality of support bars pivotally connected at their respective ends to said floor plate member and a horizontally slidable member disposed in the bottom of said unloader trough, the respective lower ends of said support bars being pivotally attached to said horizontally slidable member whereby movement of said slidable member towards the outer wall of said storage structure causes said floor plate member to collapse into the bottom of said unloader trough.

References Cited

UNITED STATES PATENTS 2,955,720  10/1960  Jones.

ROBERT G. SHERIDAN, Primary Examiner